United States Patent
Chigira (10) Patent No.: US 10,366,833 B2
(45) Date of Patent: *Jul. 30, 2019

(54) MULTILAYER CERAMIC CAPACITOR AND MANUFACTURING METHOD OF MULTILAYER CERAMIC CAPACITOR

(71) Applicant: TAIYO YUDEN CO., LTD., Chuo-ku, Tokyo (JP)

(72) Inventor: Noriyuki Chigira, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/685,943

(22) Filed: Aug. 24, 2017

(65) Prior Publication Data

US 2018/0068790 A1    Mar. 8, 2018

(30) Foreign Application Priority Data

Sep. 6, 2016   (JP) ................. 2016-174102

(51) Int. Cl.
*H01G 4/12*  (2006.01)
*H01G 4/005* (2006.01)
*H01G 4/30*  (2006.01)
*H01G 4/008* (2006.01)

(52) U.S. Cl.
CPC ............ *H01G 4/12* (2013.01); *H01G 4/005* (2013.01); *H01G 4/0085* (2013.01); *H01G 4/1209* (2013.01); *H01G 4/1227* (2013.01); *H01G 4/30* (2013.01)

(58) Field of Classification Search
CPC .......... H01G 4/30; H01G 4/008; H01G 4/1227
See application file for complete search history.

(56) References Cited

U.S. PATENT DOCUMENTS

| | | | |
|---|---|---|---|
| 7,262,146 B2 | 8/2007 | Ito et al. | |
| 9,312,070 B2* | 4/2016 | Ueda .................. | B82Y 30/00 |
| 2007/0049485 A1 | 3/2007 | Tanabe et al. | |
| 2011/0130268 A1 | 6/2011 | Wang et al. | |
| 2014/0085769 A1 | 3/2014 | Ueda et al. | |
| 2014/0240898 A1 | 8/2014 | Kim et al. | |
| 2014/0355176 A1 | 12/2014 | Lee et al. | |
| 2015/0270067 A1 | 9/2015 | Iinuma et al. | |
| 2016/0118188 A1 | 4/2016 | Wada | |

(Continued)

FOREIGN PATENT DOCUMENTS

| | | |
|---|---|---|
| JP | 2010103198 A | 5/2010 |
| JP | 2014067775 A | 4/2014 |
| JP | 2014236214 A | 12/2014 |

OTHER PUBLICATIONS

Non-Final Office Action issued by U.S. Patent and Trademark Office, dated Jun. 25, 2018, for U.S. Appl. No. 15/685,978.

*Primary Examiner* — Karl E Group
(74) *Attorney, Agent, or Firm* — Law Office of Katsuhiro Arai (57) ABSTRACT

A multilayer ceramic capacitor includes: a multilayer structure in which each of a plurality of ceramic dielectric layers and each of a plurality of internal electrode layers including a ceramic co-material are alternately stacked, wherein a concentration of Mg in a ceramic grain that is included in the ceramic dielectric layer and contacts to the internal electrode layer is smaller than that in the co-material.

17 Claims, 4 Drawing Sheets

(56) References Cited

U.S. PATENT DOCUMENTS

| | | |
|---|---|---|
| 2016/0118191 A1 | 4/2016 | Kanzaki |
| 2016/0189865 A1 | 6/2016 | Kawamura et al. |
| 2016/0189868 A1 | 6/2016 | Sasaki et al. |
| 2018/0040423 A1* | 2/2018 | Nagaoka .............. H01G 4/1227 |
| 2018/0068797 A1 | 3/2018 | Chigira |

* cited by examiner

MULTILAYER CERAMIC CAPACITOR AND MANUFACTURING METHOD OF MULTILAYER CERAMIC CAPACITOR

CROSS-REFERENCE TO RELATED APPLICATION

This application is based upon and claims the benefit of priority of the prior Japanese Patent Application No. 2016-174102, filed on Sep. 6, 2016, the entire contents of which are incorporated herein by reference.

FIELD

A certain aspect of the present invention relates to a multilayer ceramic capacitor and a manufacturing method of a multilayer ceramic capacitor.

BACKGROUND

Recently, electronic devices such as smart phones or mobile phones are being downsized. Thereby, electronic components mounted on the electronic devices are rapidly being downsized. For example, in a field of multilayer ceramic electronic components of chip type represented by a multilayer ceramic capacitor, although property is secured, thicknesses of ceramic layers and internal electrodes are reduced in order to reduce a chip size.

Generally, a composition of a ceramic grain used as a co-material is the same as that of a dielectric layer (for example, see Japanese Patent Application Publications No. 2010-103198, No. 2014-067775 and No. 2014-236214.

SUMMARY OF THE INVENTION

For enlargement of a capacitance of a multilayer ceramic capacitor, reduction of a thickness of ceramic layers and enlargement of a dielectric constant of a material of the ceramic layers are effective. For the reduction of the thickness of the ceramic layers, a downsizing of a diameter of the material is effective. However, the downsizing causes reduction of the dielectric constant because of size effect. In order to solve the problem, there are many inventions relating to a composition of a dielectric body and control of a fine structure. As an example of a dopant, Mg (magnesium) is known. A function such as smoothing of a capacitance (dielectric constant) to a temperature property caused by formation of a core shell structure is known. However, the formation may cause reduction of the dielectric constant in a room temperature. When the smoothing of the temperature property is controlled by another element or the core shell structure is easily maintained by a temperature increase rate of the baking temperature, the high dielectric constant is obtained by reducing the doping amount of Mg or never doping Mg.

On the other hand, when a thickness of an internal electrode is reduced, it is possible to increase the number of multilayer and enlarge the capacitance. However, it is not possible to maintain the high continuity modulus even if the thickness is simply reduced. And, the capacitance may be reduced because of the continuity modulus reduction. The reliability may be degraded because of defect of a ceramic layer caused by expansion in a stack direction. Therefore, there is a problem that when the thickness is reduced, the continuity modulus may be reduced. In particular, a material not including Mg for a purpose of a high dielectric constant causes reduction of the continuity modulus of the internal electrode.

The present invention has a purpose of providing a multilayer ceramic capacitor and a manufacturing method of the multilayer ceramic capacitor that are capable of achieving high dielectric constant of dielectric layers and high continuity modulus of internal electrode layers.

According to an aspect of the present invention, there is provided a multilayer ceramic capacitor including: a multilayer structure in which each of a plurality of ceramic dielectric layers and each of a plurality of internal electrode layers including a ceramic co-material are alternately stacked, wherein a concentration of Mg in a ceramic grain that is included in the ceramic dielectric layer and contacts to the internal electrode layer is smaller than that in the co-material.

According another aspect of the present invention, there is provided a manufacturing method of a multilayer ceramic capacitor including: forming a green sheet including ceramic particles; forming a multilayer structure by alternately stacking the green sheet and a conductive paste for forming an internal electrode including a ceramic co-material; and baking the multilayer structure, wherein an atomic concentration of Mg with respect to a main component ceramic of the ceramic particles in the green sheet is smaller than an atomic concentration of Mg with respect to a main component ceramic in the co-material of the conductive paste for forming an internal electrode.

DETAILED DESCRIPTION

A description will be given of an embodiment with reference to the accompanying drawings.

Embodiment

Figure 1:
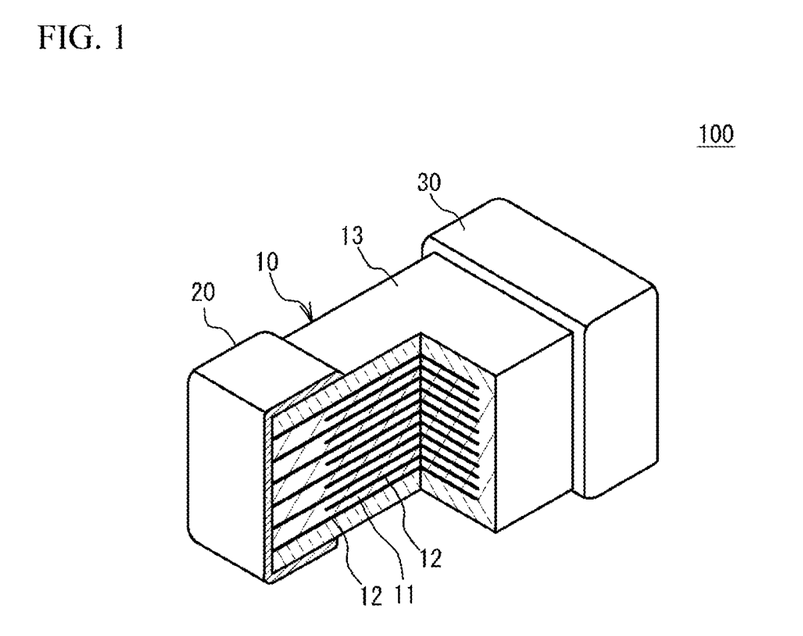
FIG. 1 illustrates a partial perspective view of a multilayer ceramic capacitor.

A description will be given of a multilayer ceramic capacitor. FIG. 1 illustrates a partial perspective view of a multilayer ceramic capacitor 100. As illustrated in FIG. 1, the multilayer ceramic capacitor 100 includes a multilayer chip 10 having a rectangular parallelepiped shape, and a pair of external electrodes 20 and 30 that are respectively provided at two edge faces of the multilayer chip 10 facing each other.

The multilayer chip 10 has a structure designed to have dielectric layers 11 and internal electrode layers 12 alternately stacked. The dielectric layer 11 includes ceramic material acting as a dielectric material. End edges of the internal electrode layers 12 are alternately exposed to a first end face of the multilayer chip 10 and a second end face of the multilayer chip 10 that is different from the first end face. In the embodiment, the first face faces with the second face. The external electrode 20 is provided on the first end face. The external electrode 30 is provided on the second end face. Thus, the internal electrode layers 12 are alternately conducted to the external electrode 20 and the external electrode 30. Thus, the multilayer ceramic capacitor 100 has a structure in which a plurality of dielectric layers 11 are stacked and each two of the dielectric layers 11 sandwich the internal electrode layer 12. In the multilayer chip 10, both end faces in the stack direction of the dielectric layers 11 and the internal electrode layers 12 (hereinafter referred to as stack direction) are covered by cover layers 13. For example, a main component of the cover layer 13 is the same as that of the dielectric layer 11.

For example, the multilayer ceramic capacitor 100 may have a length of 0.2 mm, a width of 0.1 mm and a height of 0.3 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 and the external electrodes 20 and 30 is a base metal such as nickel (Ni), copper (Cu), tin (Sn) or the like. The external electrodes 20 and 30 and the internal electrode layers 12 may be made of noble metal such as platinum (Pt), palladium (Pd), silver (Ag), gold (Au) or alloy thereof.

The dielectric layers 11 are mainly composed of $ABO_3$ (general formula) having a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \le x \le 1$, $0 \le y \le 1$, $0 \le z \le 1$) having a perovskite structure.

For enlargement of a capacitance of the multilayer ceramic capacitor 100, reduction of the thickness of the dielectric layer 11 and enlargement of dielectric constant of the material of the dielectric layer 11 are effective. For the reduction of the thickness of the dielectric layer 11, a downsizing of the diameter of the material is effective. However, the downsizing causes reduction of the dielectric constant because of size effect. In order to solve the problem, there are many inventions relating to a composition of a dielectric body and control of a fine structure. As an example of a dopant, Mg (magnesium) is known. A function such as smoothing of a capacitance (dielectric constant) to a temperature property caused by formation of a core shell structure is known. However, the formation may cause reduction of the dielectric constant in a room temperature. When the smoothing of the temperature property is controlled by another element or the core shell structure is easily maintained by a temperature increase rate of the baking temperature, the high dielectric constant is obtained by reducing the doping amount of Mg or never doping Mg.

On the other hand, when the thickness of the internal electrode layer 12 is reduced, it is possible to increase the number of multilayer and enlarge the capacitance. However, it is not possible to maintain the high continuity modulus even if the thickness is simply reduced. And, the capacitance may be reduced because of the continuity modulus reduction. The reliability may be degraded because of defect of a ceramic layer caused by expansion in a stack direction. Therefore, it is preferable that the high continuity modulus can be maintained even if the thickness is reduced. In particular, when a ceramic material that does not include Mg and acts as a co-material is doped to the internal electrode layer 12, the continuity modulus of the internal electrode layer 12 may be reduced. This may be caused by the following reasons. The internal electrode layer 12 is spheriodized in order to minimize surface energy when the sintering progresses. A metal component of the internal electrode layer 12 tends to be sintered, compared to the main component ceramic of the dielectric layer 11. Therefore, when a temperature of the dielectric layer 11 is increased so that the main component ceramic is sintered, the metal component of the internal electrode layer 12 is excessively sintered and the metal component is spheriodized. In this case, when there is a defect acting a as a trigger, the internal electrode layer 12 is broken from the defect and the continuity modulus is reduced.

Figure 2:
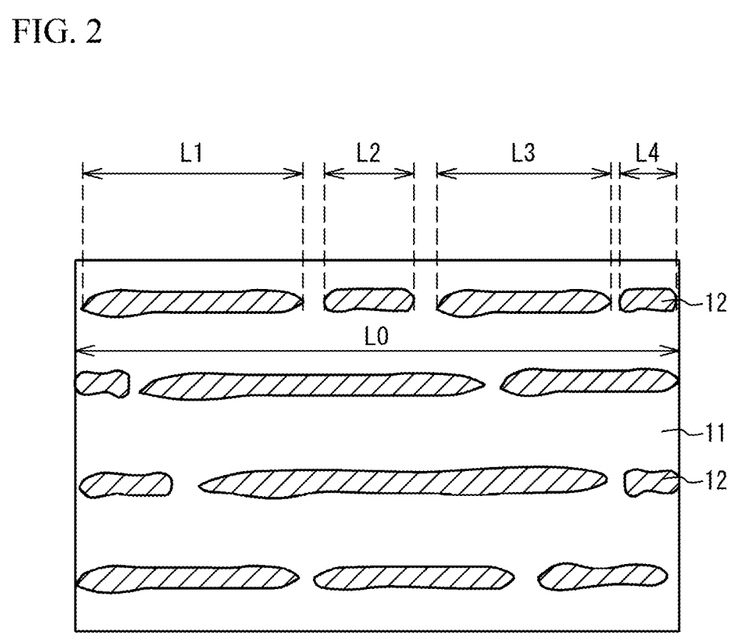
FIG. 2 illustrates a continuity modulus.

FIG. 2 illustrates the continuity modulus. As illustrated in FIG. 2, in an observed region having a length of L0 in the internal electrode layer 12, the lengths of the metal portions of L1, L2, . . . to Ln are measured and summed. A ratio of the metal component $\Sigma Ln/L0$ is defined as the continuity modulus of a layer.

In the multilayer ceramic capacitor 100 in accordance with the embodiment, a Mg concentration in at least one of ceramic grains (crystal grains) that are included in the dielectric layer 11 and contact to the internal electrode layer 12 is smaller than that in the co-material included in the internal electrode layer 12. Here, the Mg concentration in the ceramic grain is a Mg concentration (atm %) on a presumption that an amount of the B site of the main component ceramic $ABO_{3-\alpha}$ of the ceramic grain is 100 atm %. The Mg concentration in the co-material is a Mg concentration (atm %) on a presumption that an amount of the B site of the main component ceramic $ABO_{3-\alpha}$ of the co-material is 100 atm %. For example, when the main component ceramic is barium titanate, these concentrations are a concentration of Mg (atm %) on a presumption that an amount of barium titanate is 100 atm %. When a plurality of co-materials are spaced from each other in the internal electrode layer 12, the Mg concentration of the ceramic grain (crystal grain) that is included in the dielectric layer 11 and contacts to the internal electrode layer 12 is smaller than that in at least one of the co-materials included in the internal electrode layer 12. Alternatively, when a plurality of co-materials are spaced from each other in the internal electrode layer 12, the Mg concentration in the co-material may be an average of the Mg concentration in the plurality of co-materials.

Figure 3A:
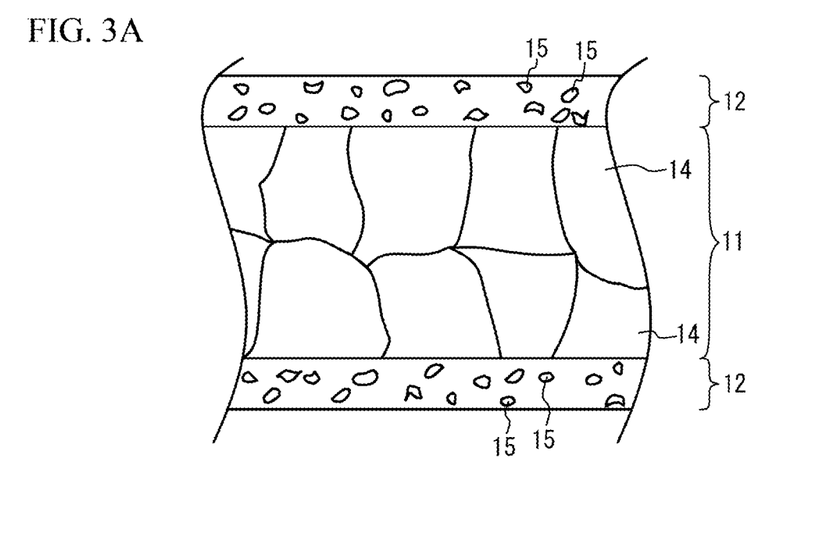
FIG. 3A and FIG. 3B illustrate the number of ceramic grains.

As illustrated in FIG. 3A, when the number of the ceramic grain 14 is one or two in at least one of regions of the dielectric layer 11 in the stack direction of the dielectric layer 11 and the internal electrode layer 12, the Mg concentration in the one or two ceramic grains 14 in the dielectric layer 11 is smaller than that in the co-material 15 included in the internal electrode layer 12. In this case, it is possible to suppress the influence of Mg in the dielectric layer 11. And it is possible to achieve the effect of Mg in the internal electrode layer 12. That is, it is possible to achieve both the high continuity modulus of the internal electrode layer 12 and the high dielectric constant of the dielectric layer 11.

Figure 3B:
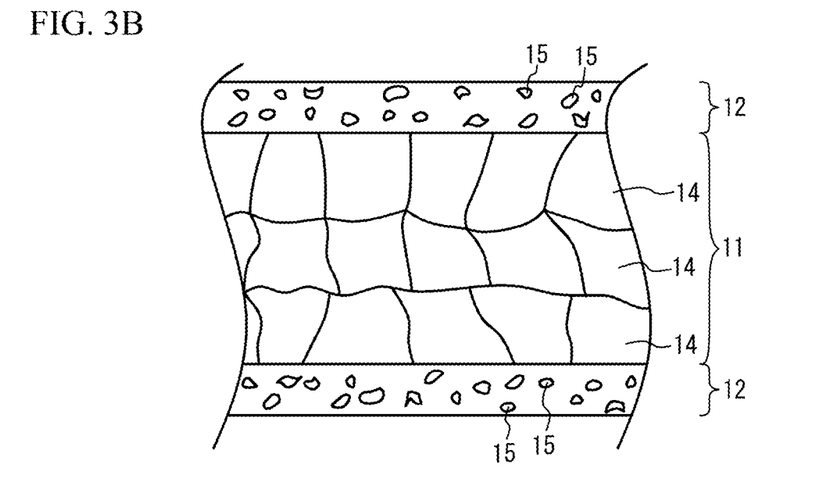

As illustrated in FIG. 3B, when the number of the ceramic grains 14 continuing in series in at least any one of positions in the dielectric layer 11 in the stack direction of the dielectric layer 11 and the internal electrode layer 12 is three or more, the Mg concentration in the one of the ceramic grains 14 contacting to the internal electrode layer 12 is smaller than that of a co-material 15 in the internal electrode layer 12. Moreover, the Mg concentration of one or more of the ceramic grains 14 not contacting to the internal electrode layer 12 is smaller than that of the ceramic grain 14 contacting to the internal electrode layer 12. In this case, the Mg concentration in the whole of the dielectric layer 11 is reduced. It is therefore possible to suppress the influence of Mg in the dielectric layer 11. And it is possible to achieve the effect of Mg in the internal electrode layer 12. That is, it is possible to achieve the high continuity modulus of the internal electrode layer 12 and the high dielectric constant of the dielectric layer 11.

When the Mg concentration in the co-material 15 of the internal electrode layer 12 is excessively small, the internal electrode layer 12 may miss the high continuity modulus. And so, it is preferable that the Mg concentration in the co-material 15 of the internal electrode layer 12 has a lower limit. On the other hand, when the Mg concentration in the co-material 15 of the internal electrode layer 12 is excessively high, oxides of a metal included in the internal electrode layer 12 may excessively diffuse. Therefore, the lifetime of the internal electrode layer 12 may be degraded. And so, it is preferable that the Mg concentration in the co-material 15 of the internal electrode layer 12 has an upper limit. In concrete, it is preferable that the Mg concentration in the co-material 15 of the internal electrode layer 12 is 0.3 atm % or more and less than 1.5 atm %. It is more preferable that the Mg concentration in the co-material 15 of the internal electrode layer 12 is 0.3 atm % or more and less than 1.0 atm %. When a plurality of co-materials 15 in the internal electrode layer 12 are spaced from each other, the Mg concentration in at least one of the co-materials 15 included in the internal electrode layer 12 may be within the above-mentioned range. Alternatively, an average of the Mg concentrations of the plurality of co-materials 15 may be within the above-mentioned range.

When the Mg concentration in the ceramic grain 14 that is included in the dielectric layer 11 and contacts to the internal electrode layer 12 is excessively high, the dielectric layer may miss the high dielectric constant. And so, it is preferable that the Mg concentration in at least one of the ceramic grains 14 contacting to the internal electrode layer 12 has an upper limit. In concrete, it is preferable that the Mg concentration in at least one of the ceramic grains 14 contacting to the internal electrode layer 12 is less than 0.7 atm %. It is more preferable that the Mg concentration in at least one of the ceramic grains 14 contacting to the internal electrode layer 12 is less than 0.3 atm %. Alternatively, an average of the Mg concentrations of a plurality of ceramic grains 14 contacting to the internal electrode layer 12 may be less than 0.7 atm % or less than 0.3 atm %.

The dielectric layer 11 is formed by baking raw material powder of which a main component is ceramic structuring the dielectric layer 11. During the baking, the raw material powder is exposed to a reductive atmosphere. Therefore, an oxygen defect may occur in the ceramic structuring the dielectric layer 11. When Mo (Molybdenum) having a valence larger than that of a B site (four) is doped in the dielectric layer 11, Mo acts as a donor element replaced to the B site. Thus, generation of the oxygen defect of the ceramic structuring the dielectric layer 11 is suppressed. And so, it is preferable that at least one of ceramic grains of the dielectric layer 11 includes Mo. In this case, a life property of the dielectric layer 11 is improved and the reliability of the dielectric layer 11 is improved. For example, it is preferable that at least one of the ceramic grains of the dielectric layer 11 includes Mo of 0.1 atm % or more on a presumption that an amount of Ti of the main component ceramic of the dielectric layer 11 is 100 atm %. Alternatively, an average of the Mo concentrations of the ceramic grains included in the dielectric layer 11 may be 0.1 atm % or more.

On the other hand, Mo may reduce a continuity modulus of the internal electrode layer 12. When influence of the reduction of the continuity modulus of the internal electrode layer 12 is larger than influence of the life property improvement of the dielectric layer 11, the reliability of the multilayer ceramic capacitor 100 may be degraded. It is preferable that the Mo concentration in the co-material 15 of the internal electrode layer 12 is smaller than that of the ceramic grains 14 of the dielectric layer 11. For example, the Mo concentration in the co-material 15 of the internal electrode layer 12 is 0.1 atm % or less. It is preferable that the co-material 15 of the internal electrode layer 12 does not include Mo.

Figure 4:
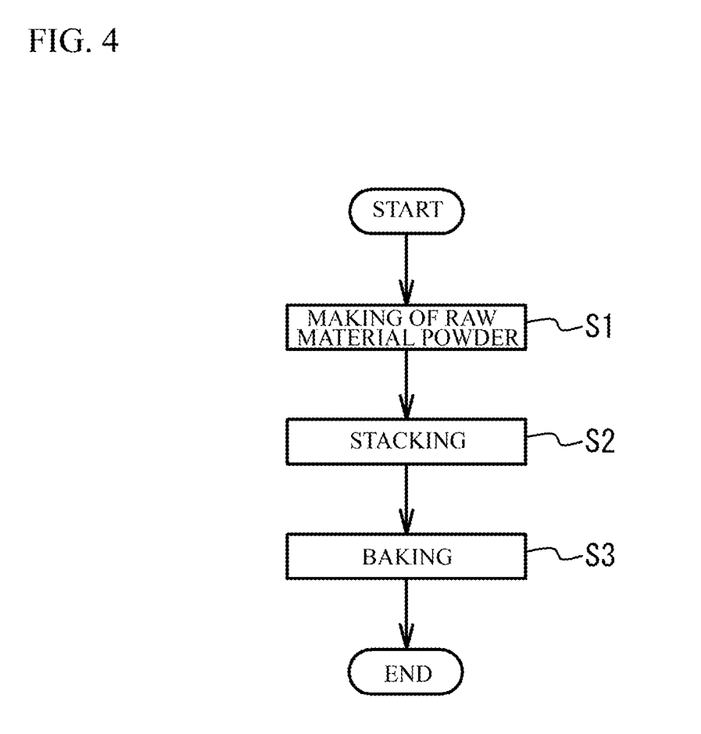
FIG. 4 illustrates a flow of a manufacturing method of a multilayer ceramic capacitor.

Next, a description will be given of a manufacturing method of the multilayer ceramic capacitor 100. FIG. 4 illustrates a manufacturing method of the multilayer ceramic capacitor 100.

[Making Process of Raw Material Powder]

As illustrated in FIG. 4, raw material powder for forming the dielectric layer 11 is prepared. Generally, an A site element and a B site element are included in the dielectric layer 11 in a sintered phase of grains of $BaTiO_3$. $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to the ceramic powder, in accordance with purposes. The additive compound may be an oxide of Mo, Mn (manganese), V (vanadium), Cr (chromium) or a rare earth element (Y (yttrium), Dy (dysprosium), Tm (thulium), Ho (holmium), Tb (terbium), Yb (ytterbium), Sm (samarium), Eu (europium), Gd (gadolinium) and Er (erbium)), or an oxide of Co (cobalt), Ni, Li (lithium), B (boron), Na (sodium), K (potassium) and Si, or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives, are dried and crushed. Thus, ceramic powder is obtained. For example, it is preferable that an average grain diameter of the resulting ceramic particles used for manufacturing the multilayer ceramic capacitor 100 is 50 nm to 150 nm from a viewpoint of thickness reduction of the dielectric layer 11. The grain diameter may be adjusted by crushing the resulting ceramic powder as needed. Alternatively, the grain diameter of the resulting ceramic power may be adjusted by combining the crushing and classifying.

[Stacking Process]

Next, a binder such as polyvinyl butyral (PVB) resin, an organic solvent such as ethanol or toluene, and a plasticizer such as dioctyl phthalate (DOP) are added to the resulting ceramic powder and wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing a conductive paste for forming an internal electrode with use of screen printing or gravure printing. The conductive paste includes an organic binder. A plurality of patterns are alternatively exposed to the pair of external electrodes. As co-materials, ceramic particles including Mg are added to the conductive paste. A main component of the ceramic particles is not limited. However, it is preferable that the main component of the ceramic particles is the same as that of the dielectric layer 11. For example, $BaTiO_3$ of which an average particle sire is 50 nm or less is evenly dispersed.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer so as to be alternately led out to a pair of external electrodes of different polarizations. Cover sheets, which are to be the cover layers 13, are stacked on the stacked green sheets and under the stacked sheets. The resulting compact is cut into a predetermined size (for example, 1.0 mm×0.5 mm). After that, conductive pastes to be the external electrodes 20 and 30 are coated on the both edge faces of the cut multilayer structure and are dried. Thus, a ceramic multilayer structure having a rectangular parallelepiped shape is obtained.

[Baking Process]

The binder is removed from the resulting ceramic multilayer structure in $N_2$ atmosphere of a temperature range of 250 degrees C. to 500 degrees C. After that, the resulting ceramic multilayer structure is baked for ten minutes to 2 hours in a reductive atmosphere in a temperature range of 1100 degrees C. to 1300 degrees C. Thus, each compound of the dielectric green sheet is sintered and grown into grains. In this manner, it is possible to manufacture the multilayer ceramic capacitor 100 that has the multilayer chip 10 having the multilayer structure in which the sintered dielectric layers 11 and the sintered internal electrode layers 12 are alternately stacked and has the cover layers 13 formed as outermost layers of the multilayer chip 10 in the stack direction.

In the baking process, a part of the co-materials may be moved to the dielectric green sheet and Mg from the co-material may diffuse into the dielectric green sheet, in a process in which the conductive paste for forming an internal electrode is sintered. Therefore, after the baking process, Mg in the co-materials 15 of the internal electrode layer 12 remains in the co-material 15. On the other hand, another Mg may be included in the ceramic grain 14 contacting to the internal electrode layer 12.

[Re-Oxidizing Process]

After that, a re-oxidizing process may be performed in $N_2$ gas atmosphere in a temperature range of 600 degrees C. to 1000 degrees C.

In another embodiment of the manufacturing method of the multilayer ceramic capacitor, the external electrodes 20 and 30 may be baked separately from the dielectric layer 11. For example, after baking a multilayer structure in which a plurality of dielectric layers 11 are stacked, conductive pastes may be formed on both edge faces by baking and the external electrodes 20 and 30 may be formed. Alternatively, the external electrodes may be formed thickly on the both edge faces of the multilayer structure by a sputtering method.

With the manufacturing method, the co-material including Mg is added to the conductive paste for forming an internal electrode layer and Mg is not added to the dielectric green sheet for forming the dielectric layer 11. In this case, the Mg concentration in the ceramic grain 14 that is included in the dielectric layer 11 and contacts to the internal electrode layer 12 is smaller than that the co-material 15 of the internal electrode layer 12, after the baking process. Alternatively, the Mg concentration (atm %) of a main component ceramic in ceramic particles of the dielectric green sheet may be smaller than that in a main component ceramic of the co-material 15 of the conductive paste for forming an internal electrode. In this case, after the baking process, the Mg concentration in the ceramic grain 14 that is included in the dielectric layer 11 and contacts to the internal electrode layer 12 can be smaller than that of the co-materials 15 of the internal electrode layer 12.

When the number of the ceramic grains 14 of the dielectric layer 11 in the stack direction of the dielectric layer 11 and the internal electrode layer 12 is one or two, the Mg concentration of the one or two ceramic grains 14 in the dielectric layer 11 can be smaller than the Mg concentration in the co-material 15 included in the internal electrode layer 12. When the number of the ceramic grains 14 continuing in series in the stack direction of the dielectric layer 11 and the internal electrode layer 12 is three or more, the Mg concentration in one or more of the ceramic grains 14 contacting to the internal electrode layer 12 can be smaller than that of the co-material 15 included in the internal electrode layer 12. Moreover, the Mg concentration in one or more of the ceramic grains 14 not contacting to the internal electrode layer 12 can be smaller than that of the ceramic grain 14 contacting to the internal electrode layer 12. In this case, it is possible to suppress the influence of Mg in the dielectric layer 11 and achieve the effect of Mg in the internal electrode layer 12. That is, it is possible to achieve both the high continuity modulus of the internal electrode layer 12 and the high dielectric constant of the dielectric layer 11.

When Mo as the co-material is not added to the conductive paste for forming an internal electrode and Mo is added to the dielectric green sheet for forming the dielectric layer 11, the life property of the dielectric layer 11 is improved and the reliability of the dielectric layer 11 is improved and the high continuity modulus of the internal electrode layer 12 is remained. Alternatively, the Mo concentration (atm %) with respect to the main component ceramic of the ceramic particles of the dielectric green sheet may be larger than the Mo concentration (atm %) with respect to the main component ceramic of the co-material in the conductive paste for forming an internal electrode.

EXAMPLES

The multilayer ceramic capacitors in accordance with the embodiment were made and the property was measured.

Examples 1 to 10

[Making of Dielectric Material]

$Ho_2O_3$, $MnCO_3$, $V_2O_5$, and $SiO_2$ were weighed so that a concentration of Ho was 0.4 atm %, a concentration of Mn was 0.2 atm %, a concentration of V was 0.1 atm % and a concentration of Si was 0.6 atm % on a presumption that an amount of Ti of barium titanate powder (an average particle diameter was 0.15 μm) was 100 atm %. And the materials were sufficiently wet-blended by a ball mill and were crushed. Thereby, a dielectric material was obtained. In examples 1 to 10, Mg was not added to the dielectric material. In the examples 2, 4, 7 and 8, $MoO_3$ was added to the dielectric material so that a concentration of Mo was 0.2 atm %. In the example 6, $MoO_3$ was added to the dielectric material so that a concentration of Mo was 0.1 atm %. In the example 9, $MoO_3$ was added to the dielectric material so that a concentration of Mo was 0.3 atm %. In the examples 1, 3, 5 and 10, Mo was not added to the dielectric material.

[Making of Conductive Paste for Forming an Internal Electrode]

$Ho_2O_3$, $MnCO_3$, $V_2O_5$, and $SiO_2$ were weighed so that a concentration of Ho was 0.5 atm %, a concentration of Mn was 0.1 atm %, a concentration of V was 0.1 atm % and a concentration of Si was 0.2 atm % on a presumption that an amount of Ti of barium titanate powder (an average particle diameter is 0.05 μm) was 100 atm %. And the materials were sufficiently wet-blended by a ball mill and were crushed. Thereby, co-material was obtained. In the examples, 1 to 4, 6, 8 and 9, MgO was added to the co-material so that a concentration of Mg was 0.7 atm %. And the resulting materials were wet-blended and were crushed. In the examples 3 and 4, in addition to MgO, $MoO_3$ was added to the co-material so that a concentration of Mo was 0.1 atm %. And the resulting materials were wet-blended and were crushed. In the example 8, in addition to MgO, $MoO_3$ was added to the co-material so that a concentration of Mo was 0.05 atm %. And the resulting materials were wet-blended and were crushed. In the examples 5 and 7, MgO was added to the co-material so that a concentration of Mg was 0.3 atm %. And the resulting materials were wet-blended and were crushed. In the example 10, MgO was added to the co-material so that a concentration of Mg was 1.0 atm %. And the resulting materials were wet blended and were crushed.

Next, the resulting co-material of 20 weight parts was added to Ni metal powders of 100 weight parts whose diameter was 0.2 μm. Moreover, ethyl cellulose and α terpineol were added. The resulting material was kneaded by three rollers. And the conductive paste for forming an internal electrode was obtained.

[Making of a Multilayer Ceramic Capacitor]

Butyral acting as an organic binder, and toluene and ethyl alcohol acting as a solvent were added to the dielectric material. A dielectric green sheet of 1.2 μm was formed by a doctor blade method. A conductive paste for forming an internal electrode was screen-printed on the resulting dielectric sheet. 250 numbers of sheets on which the conductive paste for forming an internal electrode were stacked. Cover sheets having a thickness of 30 μm were stacked on a lower face and an upper face of the stacked sheets. After that, a multilayer structure was obtained by a thermo compression bonding. And the resulting multilayer structure was cut into a predetermined shape. Ni external electrodes were formed on the resulting multilayer structure by a dip method. After removing the binder in a $N_2$ atmosphere, the resulting multilayer structure was baked at 1250 degrees C. in a reductive atmosphere ($O_2$ partial pressure: $10^{-5}$ to $10^{-8}$ atm). And sintered multilayer structure was formed. A length was 0.6 mm. A width was 0.3 mm. A height was 0.3 mm. The sintered multilayer structure was re-oxidized in a $N_2$ atmosphere at 800 degrees C. After that, metals of Cu, Ni and Sn were coated on a surface of external electrode terminals by plating. And, a multilayer ceramic capacitor was formed. After baking, the thickness of the internal electrode layers 12 was 1.0 μm.

Comparative Examples 1 to 6

In a comparative example 1, neither Mg nor Mo was added to the dielectric material. Neither Mg nor Mo was added to the co-material. In a comparative example 2, $MoO_3$ was added to the dielectric material so that a concentration of Mo was 0.2 atm %, and Mg was not added to the dielectric material. Neither Mg nor Mo was added to the co-material. In a comparative example 3, MgO was added to the dielectric material so that a concentration of Mg in the dielectric material was 0.7 atm %, and MgO was added to the co-material so that a concentration of Mg in the co-material was 0.7 atm %. Mo wad added to neither the dielectric material nor the co-material. In a comparative example 4, MgO was added to the dielectric material so that a concentration of Mg is the dielectric material was 0.7 atm %, and $MoO_3$ was added to the dielectric material so that a concentration of Mo in the dielectric material was 0.2 atm %. Mg was added to t the co-material so that a concentration of Mg in the co-material was 0.7 atm %. Mo was not added to the co-material. In a comparative example 5, neither Mg nor Mo was added to the dielectric material. MgO was added to the co-material so that a concentration of Mg in the co-material was 1.5 atm %. Mo wad not added to the co-material. In a comparative example 6, $MoO_3$ was added to the dielectric material so that a Mo concentration in the dielectric material was 0.2 atm %. Mg was not added to the dielectric material. MgO was added to the co-material so that a concentration of Mg in the co-material was 1.5 atm %, Mo was not added to the co-material. The other conditions of the comparative examples 1 to 6 were the same as those of the examples 1 to 10.

[Analysis]

A capacitance obtaining rate and HALT (Highly Accelerated Limit Test) defect rate of the multilayer ceramic capacitors were measured.

[Capacitance Obtaining Rate]

A capacitance was measured by an LCR meter. Measured values were compared with a design value that was calculated from a dielectric constant of a dielectric material (a dielectric constant was calculated by making a disc-shaped sintered material having a size of φ10 mm×T=1 mm from only a dielectric material and measuring a capacitance), a crossing area of internal electrodes, a thickness of a dielectric ceramic layer and stack number. When a capacitance obtaining rate (measured value/design value× 100) was 91% to 105%, it was determined as acceptance (circle).

[HALT Defect Rate]

HALT tests of 125 degrees C.—12 Vdc-120 min—100 numbers were performed. Samples whose short defect rate was less than 10% were determined as acceptance (circle). Samples whose short defect rate was less than 20% were determined as (triangle). Samples whose short defect rate was 20% or more were determined as not acceptance (cross).

Table 1 shows the measured results. In the examples 1 to 10, the capacitance obtaining rate was 91% or more. This may be because the concentration of Mg in the ceramic grain 14 that was included in the dielectric layer 11 and contacted to the internal electrode layer 12 was smaller than that in the co-material 15 of the internal electrode layer 12, the influence of Mg was suppressed in the dielectric layer 11, and the effect of Mg was achieved in the internal electrode layer 12. In the examples 1 to 10, the HALT defect rate was less than 20%. This may be because the concentration of Mo in the co-material 15 of the internal electrode layer 12 was less than 1.5 atm %, and the diffusion of metal oxides structuring the internal electrode layer 12 was suppressed.

In the comparative examples 1 and 2, a capacitance obtaining rate was 90% or less. This may be because Mg was not added to the co-material and the high continuity modulus of the internal electrode layer 12 was not achieved. In the comparative examples 3 and 4, the capacitance obtaining rate was further reduced. This may be because Mg was added to the dielectric layer 11 and the dielectric constant was reduced.

In the comparative examples 5 and 6, the HALT defect rate was 20% or more. This may be because the concentration of MgO added to the co-material of the internal electrode layer 12 was 1.5 atm % and the metal oxides structuring the internal electrode layer 12 diffused.

TABLE 1

|  | COMPOSITION (atm %) | | | | EFFECT | | | |
|---|---|---|---|---|---|---|---|---|
|  | DIELECTRIC MATERIAL | | CO-MATERIAL | | CAPACITANCE | | HALT DEFECT | |
|  | Mg | Mo | Mg | Mo | OBTAINING RATE | | RATE | |
| EXAMPLE 1 | 0.0 | 0.0 | 0.7 | 0.0 | 101% | ○ | 0% | ○ |
| EXAMPLE 2 | 0.0 | 0.2 | 0.7 | 0.0 | 97% | ○ | 0% | ○ |
| EXAMPLE 3 | 0.0 | 0.0 | 0.7 | 0.1 | 93% | ○ | 6% | ○ |
| EXAMPLE 4 | 0.0 | 0.2 | 0.7 | 0.1 | 91% | ○ | 4% | ○ |
| EXAMPLE 5 | 0.0 | 0.0 | 0.3 | 0.0 | 94% | ○ | 6% | ○ |
| EXAMPLE 6 | 0.0 | 0.1 | 0.7 | 0.0 | 96% | ○ | 1% | ○ |
| EXAMPLE 7 | 0.0 | 0.2 | 0.3 | 0.0 | 93% | ○ | 10% | Δ |
| EXAMPLE 8 | 0.0 | 0.2 | 0.7 | 0.05 | 94% | ○ | 2% | ○ |
| EXAMPLE 9 | 0.0 | 0.3 | 0.7 | 0.0 | 95% | ○ | 7% | ○ |
| EXAMPLE 10 | 0.0 | 0.0 | 1.0 | 0.0 | 98% | ○ | 0% | ○ |
| COMPARATIVE EXAMPLE 1 | 0.0 | 0.0 | 0.0 | 0.0 | 90% | x | 31% | x |
| COMPARATIVE EXAMPLE 2 | 0.0 | 0.2 | 0.0 | 0.0 | 88% | x | 18% | Δ |
| COMPARATIVE EXAMPLE 3 | 0.7 | 0.0 | 0.7 | 0.0 | 82% | x | 0% | ○ |
| COMPARATIVE EXAMPLE 4 | 0.7 | 0.2 | 0.7 | 0.0 | 79% | x | 0% | ○ |
| COMPARATIVE EXAMPLE 5 | 0.0 | 0.0 | 1.5 | 0.0 | 97% | ○ | 50% | x |
| COMPARATIVE EXAMPLE 6 | 0.0 | 0.2 | 1.5 | 0.0 | 96% | ○ | 63% | x |

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a multilayer structure in which each of a plurality of ceramic dielectric layers and each of a plurality of internal electrode layers including a ceramic co-material are alternately stacked,
   wherein a concentration of Mg in a ceramic grain that is included in the ceramic dielectric layer and contacts to the internal electrode layer is smaller than that in the co-material.

2. The multilayer ceramic capacitor as claimed in claim 1, wherein the ceramic grain is any one of ceramic grains in a stack direction of the multilayer structure in a region where a number of ceramic grains in the stack direction in the ceramic dielectric layer is one or two.

3. The multilayer ceramic capacitor as claimed in claim 1, wherein:
   the ceramic dielectric layer includes three or more ceramic grains continuing in series in a stack direction of the ceramic dielectric layer; and
   a concentration of Mg in a ceramic grain not contacting to the internal electrode layer is smaller than that in the ceramic grain contacting to the internal electrode layer.

4. The multilayer ceramic capacitor as claimed in claim 2, wherein a concentration of Mo in the co-material is smaller than that in the ceramic grain of the ceramic dielectric layer.

5. The multilayer ceramic capacitor as claimed in claim 3, wherein a concentration of Mo in the co-material is smaller than that in the ceramic grain of the ceramic dielectric layer.

6. The multilayer ceramic capacitor as claimed in claim 1, wherein a main component of the ceramic grain and the co-material is barium titanate.

7. The multilayer ceramic capacitor as claimed in claim 1, wherein a main component of the internal electrode layer is Ni.

8. A manufacturing method of a multilayer ceramic capacitor comprising:
   forming a green sheet including ceramic particles;
   forming a multilayer structure by alternately stacking the green sheet and a conductive paste for forming an internal electrode including a ceramic co-material; and
   baking the multilayer structure,
   wherein an atomic concentration of Mg with respect to a main component ceramic of the ceramic particles in the green sheet is smaller than an atomic concentration of Mg with respect to a main component ceramic in the co-material of the conductive paste for forming an internal electrode.

9. The method as claimed in claim 8, wherein:
   the green sheet before the baking does not include Mg; and
   the conductive paste for forming an internal electrode before the baking includes Mg.

10. The method as claimed in claim 8, wherein a part of the co-material of the conductive paste for forming an internal electrode is diffused to the green sheet in the baking.

11. The method as claimed in claim 9, wherein a part of the co-material of the conductive paste for forming an internal electrode is diffused to the green sheet in the baking.

12. The method as claimed in claim 8, wherein an atomic concentration of Mo with respect to a main component ceramic of the ceramic particles in the green sheet is larger than that with respect to a main component ceramic of the co-material in the conductive paste for forming an internal electrode.

13. The method as claimed in claim 9, wherein an atomic concentration of Mo with respect to a main component ceramic of the ceramic particles in the green sheet is larger than that with respect to a main component ceramic of the co-material in the conductive paste for forming an internal electrode.

14. The method as claimed in claim 10, wherein an atomic concentration of Mo with respect to a main component ceramic of the ceramic particles in the green sheet is larger than that with respect to a main component ceramic of the co-material in the conductive paste for forming an internal electrode.

15. The method as claimed in claim 11, wherein an atomic concentration of Mo with respect to a main component ceramic of the ceramic particles in the green sheet is larger than that with respect to a main component ceramic of the co-material in the conductive paste for forming an internal electrode.

16. The method as claimed in claim 8, wherein a main component of the green sheet and the co-material is barium titanate.

17. The method as claimed in claim 8, wherein a main component of the conductive paste for forming an internal electrode is Ni.

* * * * *